March 4, 1952  E. MARTIN  2,588,026

SELF-FEEDING LUBRICATOR

Filed June 29, 1948

Inventor
Emile Martin
By Robert E. Burns
Attorney

Patented Mar. 4, 1952

2,588,026

UNITED STATES PATENT OFFICE 2,588,026

SELF-FEEDING LUBRICATOR

Emile Martin, Grenoble, France

Application June 29, 1948, Serial No. 35,891

4 Claims. (Cl. 184—14)

The present invention relates to a novel type of self-feeding or automatic lubricator adapted to meet all requirements for ensuring the best possible lubrication of mechanical parts.

The lubricator according to my invention comprises a supporting member having at least one duct for the passage of the lubricant, a lubricant-containing reservoir having a wall made of resilient material comprising at least one aperture, said reservoir being so mounted on said supporting member that said aperture will register with one end of said duct, and a valve member provided with a duct and communicating with the reservoir whereby the latter may be filled from a source of lubricant.

Another object of my invention is the provision of a lubricator having a member controlled by the movements of the resilient wall of the reservoir, this member obturating the duct of the valve member when the reservoir is filled.

In order to facilitate the understanding of the invention, an embodiment thereof will be described hereinafter with reference to the accompanying drawings, in which.

Figure 1:
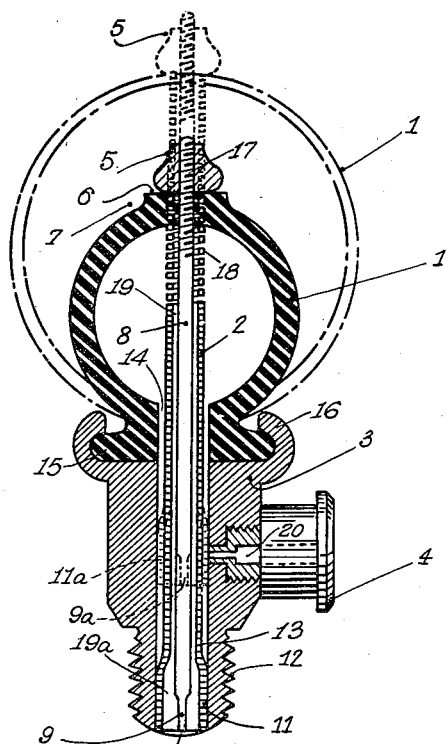
Figure 1 is a vertical section of the lubricator.

Referring to the drawing, 1 is a substantially ball-shaped oil reservoir made of an expansible liquid-tight material such as rubber and more especially synthetic rubber and 3 is a nipple, screw-threaded at 12 and formed with a longitudinal bore 13 registering with the bottom opening 14 of the rubber-reservoir, which is formed with a collar 15 firmly held in position in the beaded nipple top 16.

A flow-regulating valve member extending through the bore 13 of the nipple, the bottom opening 14 and a top opening 17 of the rubber reservoir 1 consists of three parts, viz. an elastic closely wound wire coil 2 of materially lesser outer diameter than the bore 13 of the nipple and the bottom opening 14 of the reservoir, a valve stem 8 of materially lesser diameter than the wire coil 2, and a nut 5 on the threaded top end of the stem 8. The bottom end 9 of the valve stem is flattened and has its narrow edges fixed, by soldering, brazing or other means, to the bottom portion 11 of the wire coil which is of greater diameter than the main coil body and contacts the inner wall of the bore 13, thus closing the bottom end of this bore, while being capable of axial movement, like a piston, in sliding contact with the bore wall.

Figure 2:
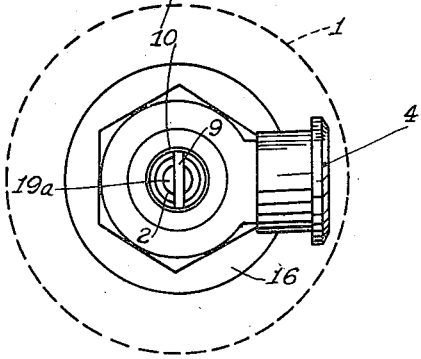
Figure 2 is a view from below of the lubricator shown in Figure 1.

The top part of the valve stem 8 extends through the narrow top opening 17 of the reservoir, its projecting end carrying the oil feed regulating nut. The windings of the coiled wire, which is closely wound throughout the greater part of its length, are spaced in the top portion 18 of the coil to the extent of affording a passage between them, for the oil in the reservoir, into the interior of the coil where a feed conduit 19 of annular section is formed between the inner wall of the coil 2 and the valve stem 8. As shown at the bottom of Fig. 1 and also in Fig. 2, this conduit is wide open at its bottom end 19a on both sides of the flattened end 9 of the stem 8 where the oil is intended to flow towards the machine part to be lubricated.

4 is a check valve serving for forcing, by the insertion of an oil gun or other supply of oil under pressure, fresh oil into the rubber ball or the like forming the reservoir 1. The pressure on the oil, as it is being forced in through the check valve, will expand the elastic reservoir as indicated in dotted lines, and after the reservoir has been thus expanded, the elastic pressure of the expanded rubber bulb will act on the oil to drive it through the feed conduit towards the part to be lubricated.

The closely wound wire coil, being formed in its top portion with a number of windings held in spaced relation serves two purposes. One is to serve as the oil feed conduit proper, while the other is to allow the oil feed to be controlled from the outside in a particularly simple manner. By simply turning the nut 5, thereby screwing it down on the valve stem 8, the distance between the widened end 11 of the coil and the nut 5 is reduced and the spaced top windings of the coil crowded more or less together, thereby throttling the passage of oil into the interior of the coil. This means of controlling the oil feed will work, no matter to what extent the elastic wall of the reservoir 1 is expanded, for this distance is affected solely by the displacement of the nut 5 on the valve stem 8, because the bottom end of the stem is fixed in the enlarged bottom end of the wire coil which, on the stem being lifted by the expanding reservoir wall, is pulled upwards in the nipple bore like a piston, as shown in dotted lines at 11a and 9a, and by covering the check valve conduit 20, throttles the oil feed and automatically prevents over-expansion and bursting of the rubber reservoir, thereby rendering a protective metal shell superfluous.

The combination above described of a closely wound wire coil with a central rod or stem fixed to the lower end of the coil and with part of the windings of that end of the coil which extends into the reservoir, spaced apart to allow the oil to flow in, constitutes a new kind of oil feed conduit and regulator. The formation, on the coil, of an enlarged portion closely contacting the inner nipple wall provides the means for shutting off at the bottom the annular conduit between the coil and the nipple bore, no matter to what extent the expansible reservoir is expanded. The nut 5 is the means for controlling the oil flow regardless of the degree of filling or expansion of the reservoir.

The form of the reservoir may be different, however a spherical expansible container is preferred for greatest relative oil capacity and most uniform pressure effect. It may consist of several nested layers of expansible material. The check-valve 4 might be arranged on the reservoir, instead of on the nipple.

The use of the lower end of the wire coil as a sliding oil-throttling piston offers the advantage of simplicity and cheapness. The spaced-windings portion of the coil is hardly to be surpassed by any other precisely adjustable valve regarding simplicity and material and manufacturing cost.

The nut 5 forms together with the top end of the spring wire coil the means for packing the passage provided in the reservoir top for the stem.

I wish it to be understood that I do not desire to be limited to the details of the embodiment shown and described by way of example, for obvious modifications will occur to a person skilled in the art.

What I claim is:

1. A lubricating device comprising, in combination, a lubricant reservoir having a movable wall portion for varying the volume of the reservoir, a conduit communicating with said reservoir, a closely wound resilient wire coil extending into said reservoir and said conduit and supported by the movable wall portion of said reservoir whereby said coil will reciprocate in said conduit in response to the movements of the said movable wall portion, a threaded valve stem extending into said coil coaxially therewith and spaced from the inner surface thereof, some of the windings in the portion of the coil inside the reservoir being spaced apart to permit passage of lubricant from said reservoir into the interior of said coil, the lower end of said valve stem being secured to said coil below said spaced windings, means integral with said coil closing the gap between said coil and said conduit, and means for adjusting the spacing of said spaced apart coils of said wire coil.

2. The combination of claim 1, in which the reservoir is expansible and the stem extends through the top part of said reservoir, and said coil adjusting means comprises a nut on said stem exteriorly of said reservoir.

3. The combination of claim 1, in which the means for closing the gap between the coil and the conduit is an enlarged portion of said wire coil.

4. Lubricator comprising in combination an expansible lubricant reservoir, an outflow tube fixed to and communicating with the interior of said reservoir, a valve stem passing through a top opening in said reservoir wall, a nut on the projecting end of said stem, a closely wound wire coil extending through said reservoir and outflow tube encircling said valve stem with a clearance, windings of said coil in said reservoir being spaced to afford a passage for lubricant, one end of said coil being enlarged to close the gap between said coil and the outflow tube and being fixed to said valve stem, means for feeding to said reservoir lubricant under pressure, said stem being so dimensioned that expansion of said lubricant reservoir beyond a predetermined limit will pull the enlarged coil end into throttling position in front of said lubricant feeding means.

EMILE MARTIN.

REFERENCES CITED

The following references are of record in the file of this patent:

UNITED STATES PATENTS

| Number | Name | Date |
|---|---|---|
| 1,891,632 | Battle | Dec. 20, 1932 |
| 1,989,451 | Hull | Jan. 29, 1935 |
| 2,235,897 | Moore | Mar. 25, 1941 |

FOREIGN PATENTS

| Number | Country | Date |
|---|---|---|
| 137,939 | Austria | June 11, 1934 |
| 420,011 | Great Britain | Nov. 22, 1934 |